(12) United States Patent
Sakagami

(10) Patent No.: US 6,449,724 B1
(45) Date of Patent: Sep. 10, 2002

(54) PORTABLE INFORMATION PROCESSING APPARATUS WITH A SUSPEND MODE AND METHOD OF CONTROLLING THE SAME

(75) Inventor: Yasuhiko Sakagami, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/088,763

(22) Filed: Jun. 2, 1998

(30) Foreign Application Priority Data

Jun. 3, 1997 (JP) .............................................. 9-144941

(51) Int. Cl.[7] .................................................. G06F 1/26

(52) U.S. Cl. ........................ 713/300; 713/323; 713/330; 713/340

(58) Field of Search ................................ 713/300, 320, 713/322, 323, 324, 340; 365/226, 227

(56) References Cited

U.S. PATENT DOCUMENTS

| | | | | |
|---|---|---|---|---|
| 5,471,621 A | * | 11/1995 | Ohtsuki | 713/323 |
| 5,832,285 A | * | 11/1998 | Shimada | |
| 5,860,016 A | * | 1/1999 | Nookata et al. | |
| 5,889,964 A | * | 3/1999 | Cho et al. | 710/101 |
| 5,964,878 A | * | 10/1999 | Ryu | 713/323 |

* cited by examiner

Primary Examiner—Ario Etienne
(74) Attorney, Agent, or Firm—Oblon, Spivak, McClelland, Maier & Neustadt, P.C.

(57) ABSTRACT

The present invention relates to a portable information apparatus which can maintain electrical power for a longer period of time. Under the condition that a suspending mode is set, when an exclusive key is manipulated, a switch monitoring circuit detects this condition and issues an interruption signal to the CPU. In this timing, the CPU supplies the necessary electrical power to a CD-ROM controller, CD-ROM drive and audio circuit which are required for reproduction of CD. Thereby, information stored on a CD can be reproduced under the suspending mode.

26 Claims, 8 Drawing Sheets

PORTABLE INFORMATION PROCESSING APPARATUS WITH A SUSPEND MODE AND METHOD OF CONTROLLING THE SAME

BACKGROUND OF THE INVENTION

1. Field of the Invention

The present invention relates to a portable information processing apparatus and a method of controlling the same.

2. Description of the Related Art

In a portable personal computer, a built-in battery supplies the necessary electrical power to each section. It has also been proposed to provide a suspending mode (sleeping mode) so that the battery can supply the electrical power for as long a period as possible.

A user sets the suspending mode in such a case that a user does not use the portable personal computer for a while. When the suspending mode is set, operation of CPU is basically stopped in the portable personal computer. Moreover, supply of electrical power to each section is basically stopped, except for the supply of electrical power to a part of the circuits which requires backup service of electrical power.

When the suspending mode is set, a user can no longer process the predetermined information using such portable personal computer. For example, even when the relevant portable personal computer has the function to play a CD (Compact Disc), this portable personal computer cannot play a CD under the condition that the suspending mode is set. Therefore, a user is requested to cancel the setting of the suspending mode to play a CD for reproduction of data. When playing of CD is instructed after canceling the suspending mode, a button icon, etc. which is required for playing of CD, as shown in FIG. 1, is displayed on an LCD of the portable personal computer. A user is now capable of playing a CD by adequately manipulating this button icon with a mouse, etc. The CPU supplies the electrical power to the entire sections of the portable personal computer when the suspending mode is canceled to realize the playing of a CD.

As explained, since the relevant portable personal computer is requested to cancel the suspending mode, when a CD is played from the condition that the suspending mode is being set, the electrical power is also supplied to a part which is not required for playing of a CD and the electrical power of the battery has been consumed unnecessarily, resulting in a problem that it is difficult to use the battery for a longer period of time.

SUMMARY OF THE INVENTION

The present invention has been proposed considering the background explained above and it is therefore an object of the present invention to control that electrical power of a battery is unnecessarily consumed and thereby a battery can supply its electrical power for a longer period of time.

An offered medium described in the present invention is characterized in providing a program comprising a setting step for setting the suspending mode, a limiting step for limiting supply of electrical power from a battery when the suspending mode is set, a detecting step for detecting an instruction for reproducing an information recording medium and a supplying step for supplying electrical power to the sections required for reproducing an information recording medium under the suspending mode condition when the instruction for reproducing the information recording medium is detected in the detecting step.

A method of controlling a portable information processing apparatus of the present invention is characterized in comprising a setting step for setting the suspending mode, a limiting step for limiting supply of electrical power from a battery when the suspending mode is set, a detecting step for detecting an instruction for reproducing an information recording medium and a supplying step for supplying electrical power to the sections required for reproducing an information recording medium under the suspending mode condition when the instruction for reproducing the information recording medium is detected in the detecting step.

A portable information processing apparatus of the present invention is characterized in comprising a setting means for setting the suspending mode, a limiting means for limiting supply of electrical power from a battery when the suspending mode is set, a detecting means for detecting an instruction for reproducing an information recording medium and a supplying means for supplying electrical power to the sections required for reproducing an information recording medium under the suspending mode condition when the instruction for reproducing the information recording medium is detected in the detecting step.

In an offered medium, a method of controlling a portable information processing apparatus and a portable information processing apparatus of the present invention, when an instruction for reproducing an information recording medium is detected in the suspending mode, electrical power is supplied to the sections required for reproduction of an information recording medium in the suspending mode condition.

As explained above, according to an offered medium, a method of controlling an information processing apparatus and a portable information processing apparatus of the present invention, when reproduction of the information recording medium is instructed under the suspending condition, electrical power is supplied to the sections required for reproduction of the information recording medium in view of supply electrical power from a battery for a longer period of time.

BRIEF DESCRIPTION OF THE DRAWINGS

Other objects and advantages of the present invention will be apparent from the following detailed description of the presently preferred embodiments thereof, which description should be considered in conjunction with the accompanying drawings.

DESCRIPTION OF THE PREFERRED EMBODIMENTS

The preferred embodiments of the present invention will be explained below. In this case, however, the corresponding embodiment (only an example) will be additionally described in the parentheses after each means to clear the characteristic of the present invention in view of disclosing the relationship between each means of the present invention and each embodiment thereof. However, it does not mean that this description is limited to each means.

The portable information processing apparatus described in the present invention is characterized in comprising a setting means (for example, step S3 of FIG. 7) for setting the suspending mode, a limiting means (for example, step S4 in FIG. 7) for limiting supply of electrical power from a battery when the suspending mode is set, a detecting means (for example, step S21 of FIG. 9) for detecting an instruction for reproducing an information recording medium in the suspending mode and a supplying means (for example, step S24 of FIG. 9) for supplying electrical power to a part which is required to reproduce an information recording medium in the suspending mode condition when the instruction for reproducing the information recording medium is detected by the detecting means.

Figure 1:
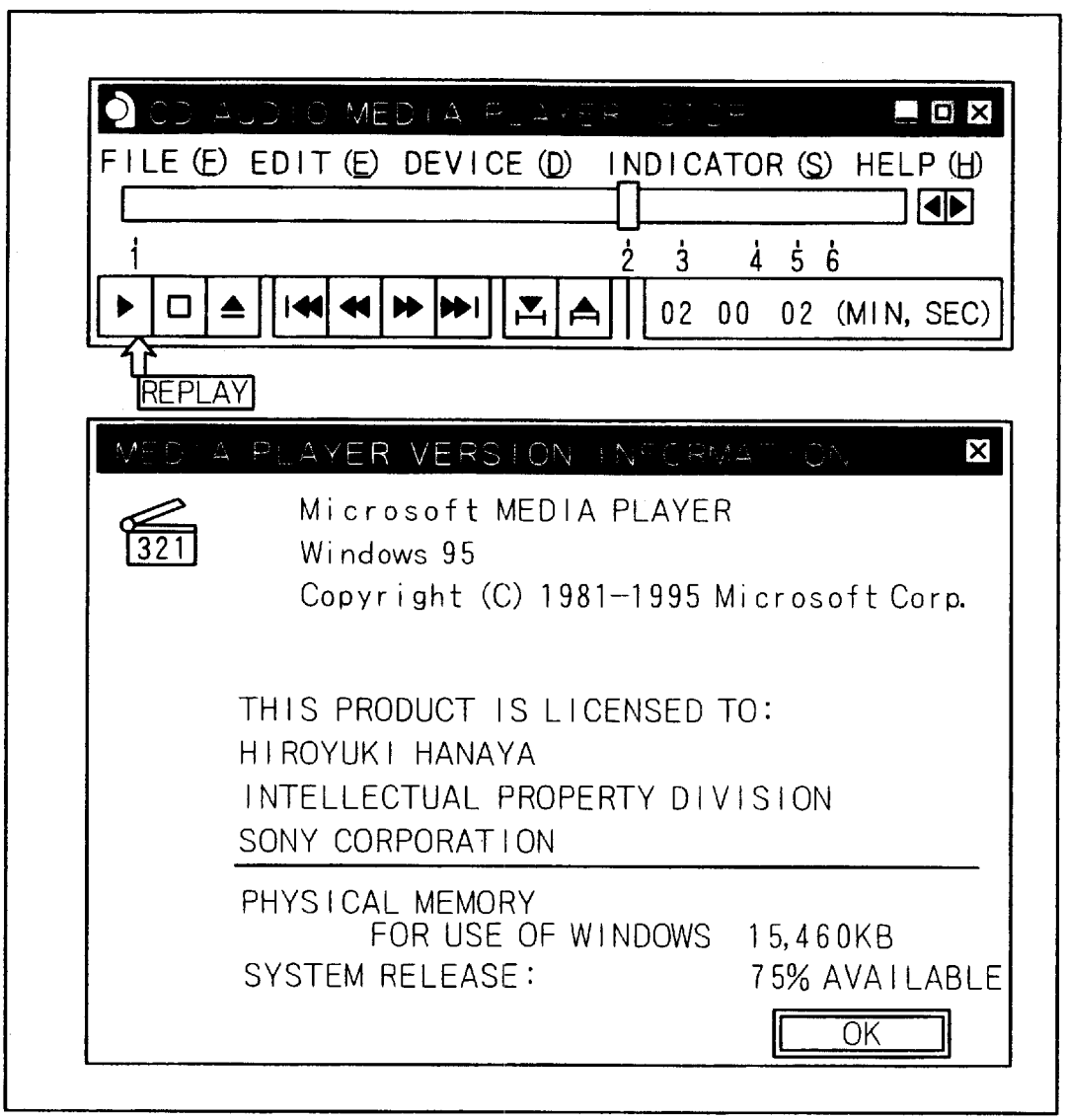
FIG. 1 shows a display example during reproduction of a CD in the related portable personal computer.
Figure 2:
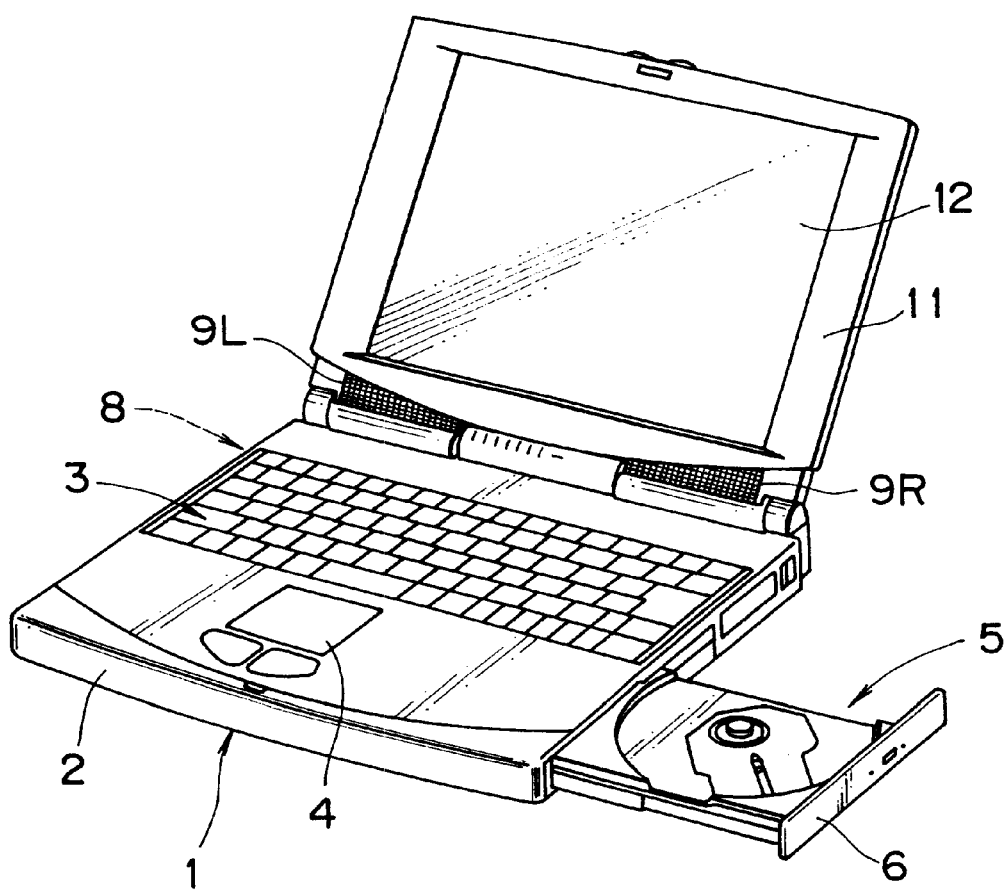
FIG. 2 is a perspective view showing an external structure of a portable personal computer to which the present invention is applied.
Figure 3:
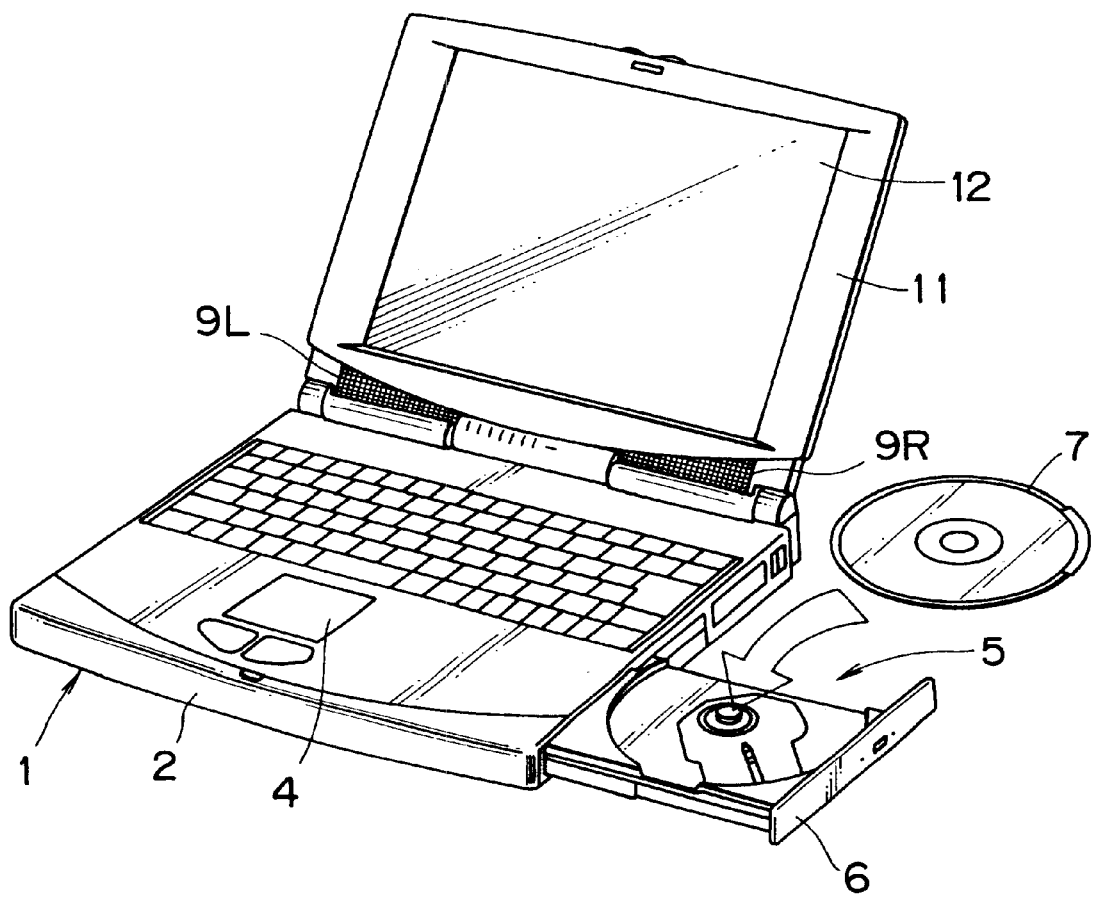
FIG. 3 is a perspective view showing an external structure of a portable personal computer to which the present invention is applied.
Figure 4:
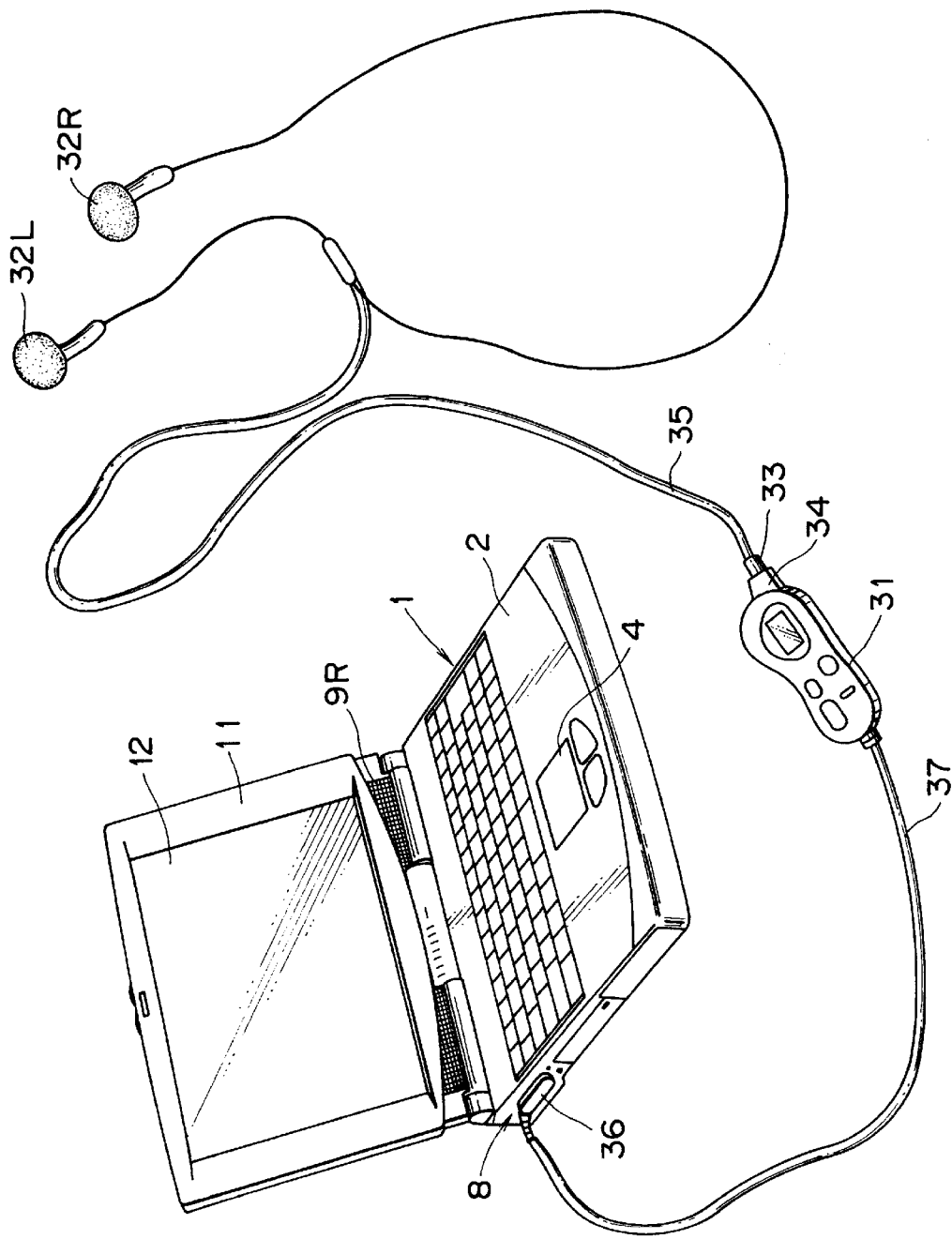
FIG. 4 is a perspective view showing an external structure of a portable personal computer to which the present invention is applied.

FIG. 2 to FIG. 4 show an external structure of a portable personal computer to which the present invention is applied. As shown in these figures, this portable personal computer 1 is composed of a body 2 and a rotating cover 11 which is freely rotated against the body 2. At the upper surface of the body 2, key section 3 which is manipulated for inputting characters and codes, etc. and a touch pad 4 which is manipulated for moving a cursor and executing the defining processes are provided. At the side surface on the right side of the body 2, a CD-ROM drive 5 is provided. A CD-ROM can be loaded to a tray 6 by drawing the tray of the CD-ROM drive 5 from the body (FIG. 3 and FIG. 4). Moreover, at the inverse side (left side) of the CD-ROM drive, a jack 8 is provided (FIG. 2, 4) for connection of a plug 36 (FIG. 4) forming a headphone system. Moreover, at the upper rear surface, speakers 9L, 9R are also provided in the right and left sides.

At the front surface of the rotating cover 11, an LCD 12 is provided and the predetermined characters and images are displayed.

Figure 5:
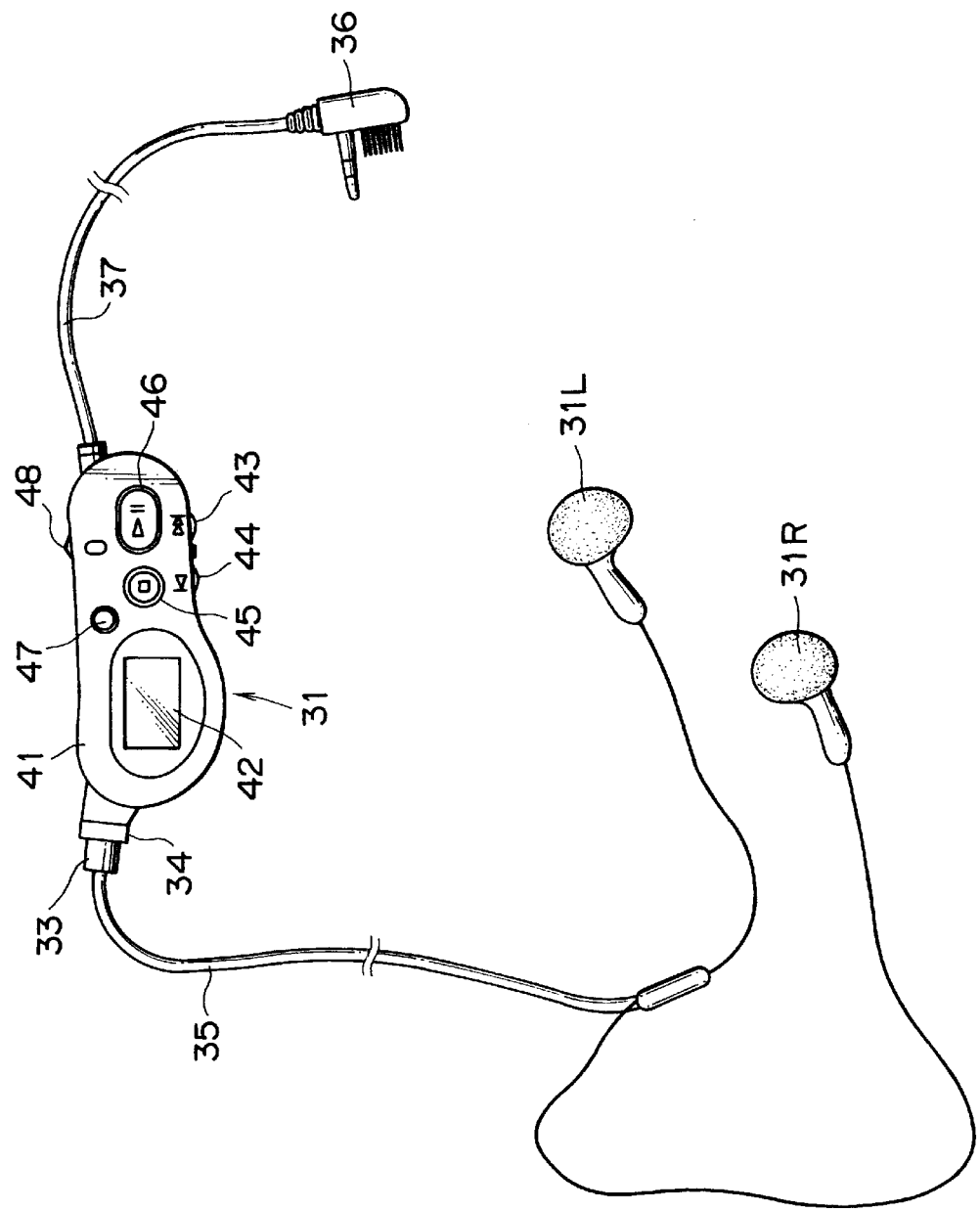
FIG. 5 shows a structure of a headphone system.

FIG. 5 shows a detail structure of the headphone system. In this headphone system, the jack 34 of a remote controller 31 is connected with the plug 33. This plug 33 is connected with right and left headphones 31L, 31R via a lead 35.

In addition, a case 41 for the remote controller 31 is connected with a plug 36 via a lead 37. At the upper surface of the case 41, an LCD 42 for displaying various pieces of information, a PLAY key 46 manipulated for instructing reproduction, a STOP key 45 manipulated for instructing stop of operation and a DSP key 47 are provided.

Moreover, at the side surface of the case 41, an FF key 43 for instructing fast feeding operation, a REW key 44 manipulated for instructing high speed rewinding operation and a hold switch 48 are provided.

Figure 6:
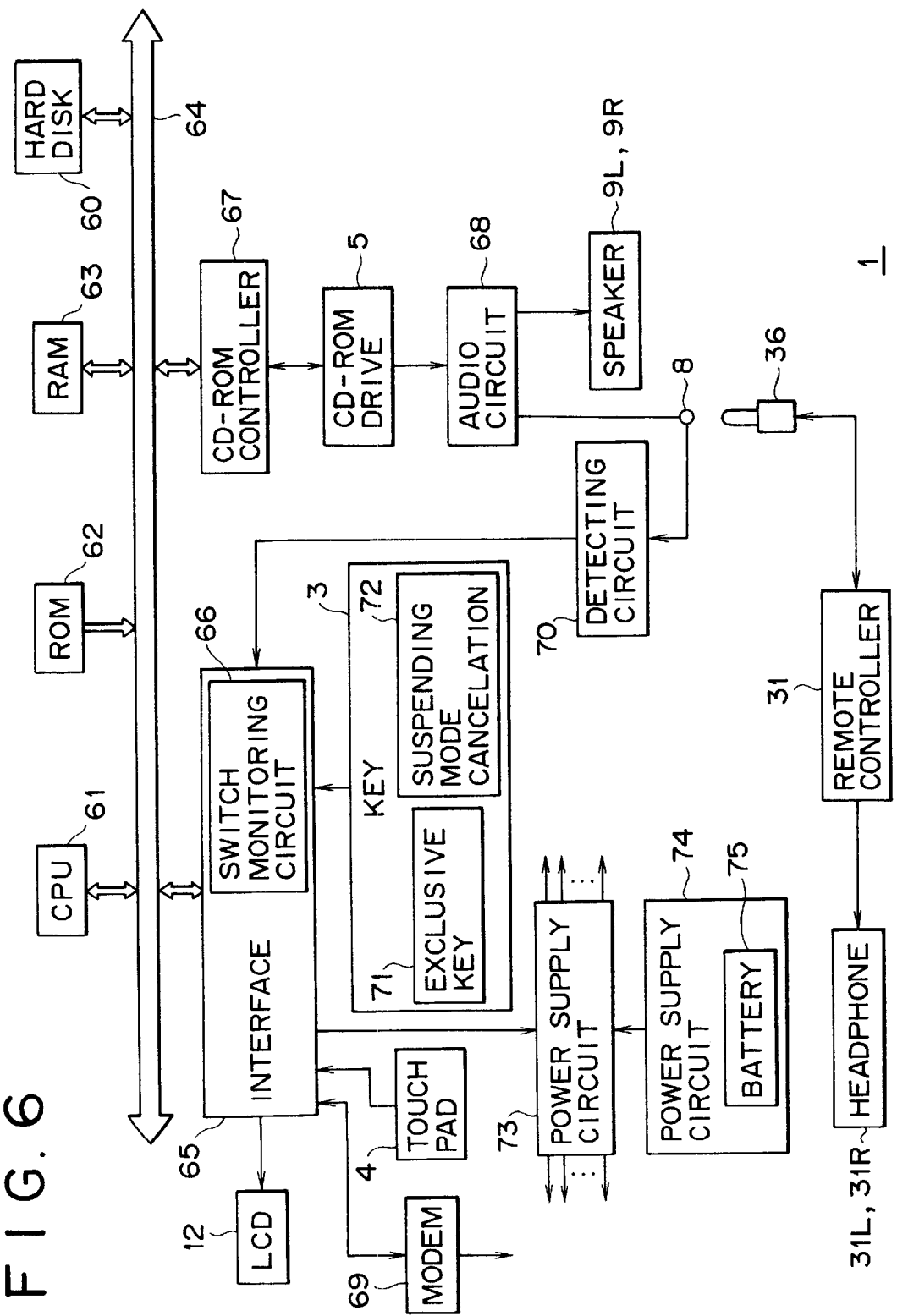
FIG. 6 is a block diagram showing a structure example of a portable personal computer of FIG. 2.

FIG. 6 shows an internal structure example of a portable personal computer 1. CPU 61 executes various kinds of processes depending on the programs stored in a ROM 62. In the RAM 63 and hard disc 60, the data and programs required for executing various processes in the CPU 61 are stored as required. An input/output interface 65 outputs and displays the data input via a bus 64 from the CPU 61 to the LCD 12. The interface 65 also controls a power supply circuit 73 to control supply of electrical power to each section from the power supply circuit 74 having a battery 5.

The interface 65 also detects an input from a touch pad 4 and outputs the input to the CPU 61 via the bus 64. In the same manner, when any key 3 is manipulated, the interface 65 outputs a signal corresponding to the key manipulated to the CPU 61 via the bus 64. The predetermined key of the key 3 defines, depending on the assignment of functions to the key, an exclusive key 71 which is manipulated for reproducing a CD in the suspending mode or a suspending mode canceling key 72 manipulated for canceling the suspending mode.

The interface 65 also comprises a switch monitoring circuit 66 to monitor manipulation of exclusive key 71 of the key 3 and a detecting signal of the detecting circuit 70. The detecting circuit 70 detects connection between the plug 36 and jack 8 when the plug 36 is inserted to the jack 8 and then sends the detecting signal to the switch monitoring circuit 66. The switch monitoring circuit 66 outputs an interruption signal to the CPU 61 via the bus 64 when the exclusive key 71 is manipulated or detecting signal is input from the detecting circuit 70 in the suspending mode. A modem 69 is controlled by the CPU 6 via the interface 65 to receive and send the data via the telephone line.

A CD-ROM controller 67 controls the CD-ROM drive 5 corresponding to an instruction input from the CPU 61 in order to play the CD-ROM 7. The data obtained by reproduction of CD-ROM is output to the CPU 61 via the bus 64 from the CD-ROM controller 67.

Moreover, when a CD in which an ordinary music program is recorded is played by the CD-ROM drive 5, the reproduced data is output to an audio circuit 68 to perform of demodulating process and error correcting process. Thereafter, the reproduced signal is supplied to the speakers 9L, 9R and it is also supplied to the headphones 31L, 31R via the jack 8.

Figure 7:
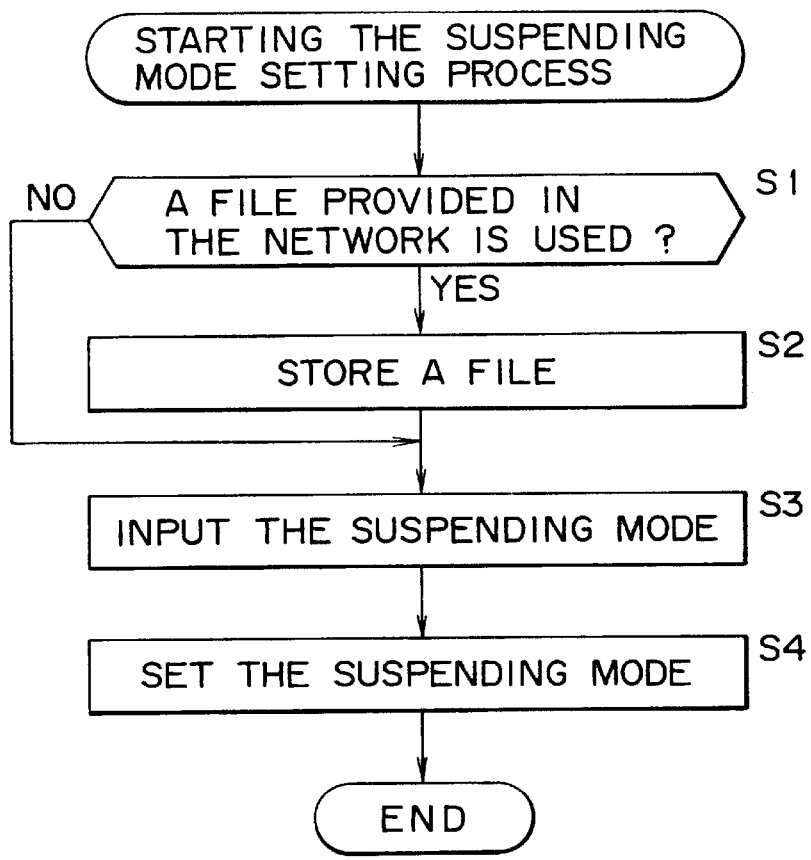
FIG. 7 is a flowchart for explaining the processes for setting the suspending mode of a portable personal computer of FIG. 6.

Next, the process for setting the suspending mode in the portable personal computer 1 is explained with reference to the flowchart of FIG. 7. First, in step S1, a user judges whether a file in the network is used via a modem 69 or not. When a file is used, the process for storing this file, for example, to the hard disc 60 in step S2. This process is executed to use the file even if the suspending mode is reset when the connection is canceled because the connection with the network is sometimes canceled when the suspending mode is set. When a file in the network is not used, the process of step S2 is skipped.

Next, in step S3, a user instructs and inputs the suspending mode. This input is executed by manipulating the predetermined key among the key 3. For example, in the operating software, Windows 95 (Trademark), this input is executed by selecting the command of "Suspending" from the pull-down menu which is displayed by clicking the "Start" button. In this case, selection is performed via the cursor by manipulating a touch pad 4.

The CPU 61 sets the suspending mode in step S4 when the suspending mode is input. In this suspending mode, the CPU 61 controls a power supply circuit 73 via the interface 65 to stop the supply of electrical power to each section. In this case, the CPU 61 is stopped to execute the processes. Thereby, nothing is displayed, for example, on the LCD 12, disabling the modem 69 and CD-ROM drive 6. Manipulation of key 3 except for the exclusive key 71 and suspending mode canceling key 72 and manipulation of touch pad 4 are not accepted by the CPU 61. Of course, the CPU 61 cannot execute various kinds of application programs such as word processor and game, etc.

Figure 8:
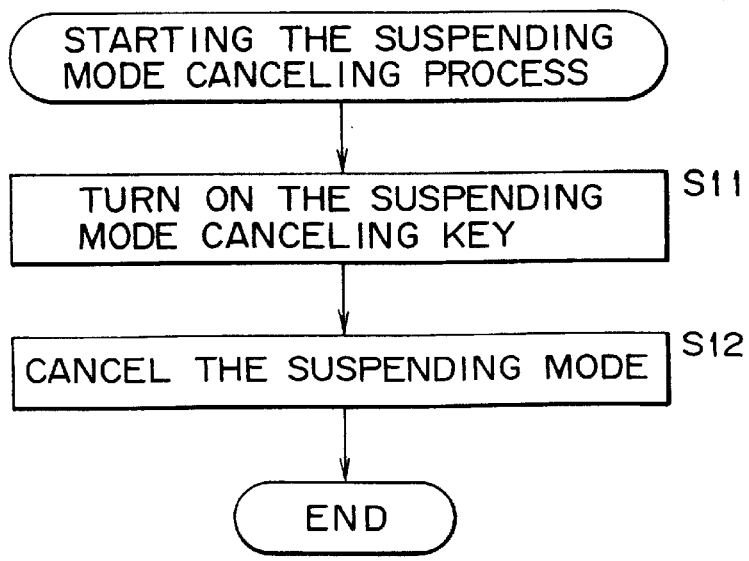
FIG. 8 is a flowchart for explaining the processes for canceling the suspending mode of a portable personal computer of FIG. 6.

As explained above, when the suspending mode is canceled in the condition that the suspending mode is being set, the processes indicated in the flowchart of FIG. 8 are executed.

Namely, first, in step, S11, a user manipulates the suspending mode canceling key 72 of the key 3. This manipulation is transferred to the CPU 61 via the interface 65. Thereby, the CPU 61 starts again the execution in step S12 and cancels the suspending mode which as been set. In this timing, the CPU 61 controls the power supply circuit 73 via the interface 65 to supply necessary electrical power to each section. Thereby, each section of the portable personal computer 1 is ready for operation. Therefore, a user is capable of making access to the predetermined server from the Internet by executing the word processor or game software or via the modem 69. Of course, the CD-ROM can also be played for reproduction of data.

Figure 9:
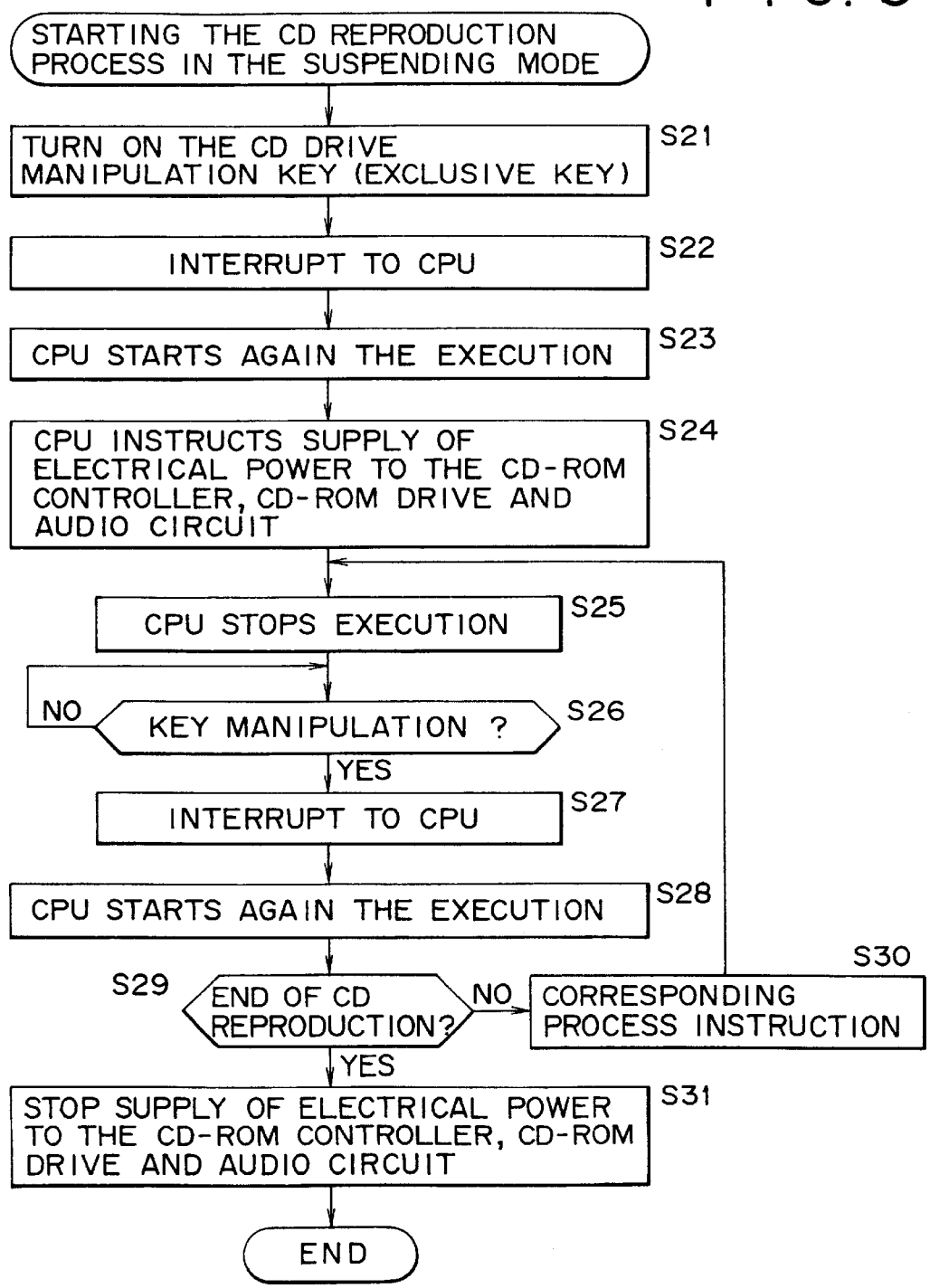
FIG. 9 is a flowchart for explaining the reproducing process in the suspending mode of a portable personal computer of FIG. 6.

Next, the process for playing a CD under the suspending mode condition will be explained with reference to the flowchart of FIG. 9. When it is attempted to play a CD in the suspending mode, a user manipulates, in step S21, the exclusive key 71 for instructing the CD drive operation of the key 3. When the exclusive key 71 is manipulated, the switch monitoring circuit 66 detects manipulation of the key 71. Alternatively, when the plug 36 is connected to the jack 6, the detecting circuit 70 detects the connection and outputs a detection signal to the switch monitoring circuit 66. In any case, the switch monitoring circuit 66 outputs an interruption signal to the CPU 61 in step S22. In this case, the CPU 61 starts again the execution in step S23 corresponding to this interruption signal.

In step S24, the CPU 61 supplies electrical power only to apart which is required to play a CD among each section -of the portable personal computer 1. Namely, CPU 61 controls the power supply circuit 73 via the interface 65 to supply electrical power to the CD-ROM controller 67, CD-ROM drive 5 and audio circuit 68. Thereafter, the CPU 61 stops execution to provide the low power consumption mode in step S25.

Next, in step S26, the CPU 61 is in the waiting condition of the low power consumption mode while keeping the execution being stopped until the predetermined key is manipulated among various kinds of keys provided on the remote controller 31. When the predetermined key of the remote controller 31 is manipulated, such manipulation signal is supplied to the switch monitoring circuit 66 via the plug 36, jack 8 and detecting circuit 70. The switch monitoring circuit 66 outputs the interruption signal to the CPU 61 in step S27 when the manipulation signal is input. In this timing, the CPU 61 starts again the execution in step S28.

Next, the CPU 61 judges, in step S29, whether the manipulated key is the STOP key 45 for instructing the end of reproduction of CD or not. If the manipulated key is not the STOP key 45, the CPU 61 executes the process corresponding to the manipulated key in step-S30.

When the PLAY key, for example, is manipulated, the CPU 61 requests playing of CD to the CD-ROM controller 67 via the bus 64. The CD-ROM controller 67 controls, upon reception of this request from the CPU 61, the CD-ROM drive 5 to reproduce this CD. The signal reproduced from the CD is then output to an audio circuit 68 for the demodulation process and error correction process and is then output from the speakers 9L, 9R. Alternately, the reproduced signal output from the audio circuit 68 is output from the headphones 31L, 31R via the jack 8, plug 36 and remote controller 31.

Thereafter, returning to step S26, the CPU 61 stops execution and waits for the next key manipulation in the step S26.

In step S29, when the manipulated key is judged as the STOP key 45, the CPU 61 skips to step S31 to stop the supply of electrical power to the CD-ROM controller 67, CD-ROM drive 5 and audio circuit 68. Namely, the CPU 61 again stops the supply of electrical power to the circuits to which the electrical power is supplied in step S24.

As explained above, since electrical power is supplied only to the part required for reproducing a CD under the condition that the suspending mode is being set in this embodiment, consumption of the electrical power during reproduction of CD can be reduced more than in the case where CD is reproduced by supplying electrical power to the entire portions of the portable personal computer 1. Moreover, since the CPU 61 can be set to the condition for stopping the execution even during the reproduction of CD, power consumption by the CPU 61 (power consumption by the CPU 61 is about a half of the total power consumption by portable personal computer 1) can also reduced. As a result, it is now possible for a battery 75 to supply electrical power to each section for a longer period of time.

In the embodiment explained above, an exclusive key 71 for instructing reproduction of CD in the suspending mode is provided in the key 3, but it is also possible that various keys of the remote controller 31 are defined as the exclusive keys and when these are manipulated, it is detected by the switch monitoring circuit 66 to reproduce the CD.

Moreover, in the above embodiment, an example of playing a CD has been explained, but the present invention can also be applied to reproduction of the other information recording medium than the CD. Furthermore, the present invention can also be applied to a portable information processing apparatus other than a portable personal computer.

A program for executing various processes explained above may be recorded on a recording medium such as a floppy disk and CD-ROM disc, etc. and offered to users directly or through transmission via the network. The offered programs can be stored as required by installing to RAM 63 or hard disc 60.

What is claimed is:

1. A computer-readable medium for storing a program to control the operation of a portable information processing apparatus for playing information stored on a recording medium using electrical power supplied from a battery, the computer-readable medium comprising:

a computer code mechanism configured to set a suspending mode;

a computer code mechanism configured to limit supply of electrical power from said battery when the suspending mode is set;

a computer code mechanism configured to detect an instruction for playing said stored information in said suspending mode; and a computer code mechanism configured to supply, under said suspending mode, electrical power to said information processing apparatus for playing said stored information when said instruction to play said stored information is detected.

2. The computer-readable medium of claim 1, further comprising a computer code mechanism configured to control a processor configured to control the operation of said portable information processing apparatus to a stop execution state during the playback of said stored information.

3. The computer-readable medium of claim 1, further comprising a computer code mechanism configured to detect manipulation of an exclusive key for initiating playback of said stored information as the instruction for playing back said stored information or connection of a plug to an output terminal for outputting a signal reproduced from said recorded information.

4. A method of controlling a portable information processing apparatus for playing information stored on a recording medium by utilizing electrical power supplied from a battery, comprising the steps of:
 setting a suspending mode;
 limiting supply of electrical power from said battery when said suspending mode is set;
 detecting an instruction for playing said stored information in said suspending mode;
 supplying, when the instruction for playing said stored information is detected in said detecting step and under the conditions of said suspending mode, electrical power to said information processing apparatus for playing of said stored information.

5. The method of claim 4, further comprising a stopping step for controlling a processor configured to control the operation of said portable information processing apparatus to a stop execution state during the playback of said stored information.

6. The method of claim 4, wherein manipulation of an exclusive key for initiating playback of said stored information as the instruction for playing said stored information or connection of a plug to an output terminal for outputting a signal reproduced from said information recording medium is detected in said detecting step.

7. A portable information processing apparatus for playing information stored on a recording medium by utilizing electrical power supplied from a battery, comprising:
 setting means for setting a suspending mode;
 limiting means for limiting supply of electrical power from said battery when said suspending mode is set;
 detecting means for detecting an instruction for playing said stored information in said suspending mode, and
 supplying means for supplying electrical power to said information processing apparatus for playing said stored information under the condition of said suspending mode when an instruction for playing said stored information is detected by said detecting means.

8. The apparatus of claim 7, further comprising stopping means for controlling a processor configured to control the operation of said portable information processing apparatus to a stop execution state during playback of said stored information.

9. The apparatus of claim 7, wherein said detection means is further configured to detect manipulation of an exclusive key for initiating playback of said stored information as the instruction for playing said stored information or connection of a plug to an output terminal for outputting a signal reproduced from said information.

10. A portable information processing apparatus for playing information stored on a recording medium by utilizing electrical power supplied from a battery, comprising:
 a status detection unit for detecting that a processor coupled to the status detecting unit is deactivated;
 a detection unit for detecting an instruction for playing said information stored on the recording medium; and
 a power supply unit for supplying electrical power to said information processing apparatus for playing said stored information under the conditions of a suspending mode when the instruction for playing said stored information is detected by said detection unit.

11. The apparatus of claim 10 further including a stop execution unit for controlling the processor to a stop execution state during a playback operation of said stored information.

12. The apparatus of claim 11 wherein said detection unit is further configured to detect manipulation of an exclusive key for initiating playback of said stored information as the instruction for playing said stored information or connection of a plug to an output terminal for outputting a signal reproduced from said information.

13. The apparatus of claim 10 wherein said detection unit is further configured to detect manipulation of an exclusive key for initiating playback of said stored information as the instruction for playing said stored information or connection of a plug to an output terminal for outputting a signal reproduced from said information recording medium.

14. The computer-readable medium of claim 2, wherein manipulation of an exclusive key for initiating playback of said stored information as the instruction for said stored information or connection of a plug to an output terminal for outputting a signal reproduced from said information is detected by the computer code mechanism configured to detect the instruction.

15. The method of claim 4, wherein manipulation of an exclusive key for initiating playback of said stored information as the instruction for playing said stored information or connection of a plug to an output terminal for outputting a signal reproduced from said information is detected in said detecting step.

16. The apparatus of claim 8 wherein said detection means is further configured to detect manipulation of an exclusive key for initiating playback of said stored information as the instruction for playing said stored information or connection of a plug to an output terminal for outputting a signal reproduced from said information.

17. A method of controlling a portable information processing apparatus for playing information stored on a recording medium by utilizing electrical power supplied from a battery, comprising the steps of:
 detecting that a processor of the information processing apparatus is deactivated;
 detecting an instruction for playing said information stored on the recording medium;
 supplying electrical power to said information processing apparatus for playing said stored information while the processor is deactivated and when the instruction for playing said stored information is detected.

18. The method of claim 17, further comprising the step of:
 placing the processor in a stop execution state during the playback of said stored information.

19. The method of claim 18, wherein the step of detecting the instruction comprises the step of:
 detecting manipulation of an exclusive key for initiating playback of said stored information as the instruction for playing said stored information or connection of a plug to an output terminal for outputting a signal reproduced from said information.

20. The method of claim 17, wherein the step of detecting the instruction comprises the step of:

detecting manipulation of an exclusive key for initiating playback of said stored information as the instruction for playing said stored information or connection of a plug to an output terminal for outputting a signal reproduced from said information recording medium.

21. The method of claim 17, wherein the step of detecting that the processor is deactivated comprises the step of:

detecting that the processor is in a suspending mode.

22. A computer-readable medium for storing a program to control the operation of a portable information processing apparatus for playing information stored on a recording medium using electrical power supplied from a battery, the computer-readable medium comprising:

a computer code mechanism configured to detect that a processor of the information processing apparatus is deactivated;

a computer code mechanism configured to detect an instruction for playing said information stored on the recording medium; and a computer code mechanism configured to supply electrical power to said information processing apparatus for playing said stored information while the processor is deactivated and when the instruction for playing said stored information is detected.

23. The computer-readable medium of claim 22, further comprising:

a computer code mechanism configured to place the processor in a stop execution state during the playback of said stored information.

24. The computer-readable medium of claim 23, wherein the computer code mechanism configured to detect the instruction comprises:

a computer code mechanism configured to detect manipulation of an exclusive key for initiating playback of said stored information as the instruction for playing said stored information or connection of a plug to an output terminal for outputting a signal reproduced from said information.

25. The computer-readable medium of claim 22, wherein the computer code mechanism configured to detect the instruction comprises:

a computer code mechanism configured to detect manipulation of an exclusive key for initiating playback of said stored information as the instruction for playing said stored information or connection of a plug to an output terminal for outputting a signal reproduced from said information recording medium.

26. The computer-readable medium of claim 22, wherein the computer code mechanism configured to detect that the processor is deactivated comprises:

a computer code mechanism configured to detect that the processor is in a suspending mode.

\* \* \* \* \*

UNITED STATES PATENT AND TRADEMARK OFFICE
CERTIFICATE OF CORRECTION

PATENT NO. : 6,449,724 B1
DATED : September 10, 2002
INVENTOR(S) : Yasuhiko Sakagami It is certified that error appears in the above-identified patent and that said Letters Patent is hereby corrected as shown below:

Column 1,
Line 13, insert -- has -- before "been"

Column 5,
Line 15, delete "as" and add -- has --
Line 39, insert a space between the words "a" and "part"
Lines 39 and 61, delete "-" (hyphen)

Column 8,
Line 5, delete "a" and add -- said --

Signed and Sealed this

Eighth Day of April, 2003

JAMES E. ROGAN
*Director of the United States Patent and Trademark Office*